(12) United States Patent
Winker et al.

(10) Patent No.: US 6,456,419 B1
(45) Date of Patent: Sep. 24, 2002

(54) FREQUENCY MODULATED LIQUID CRYSTAL BEAMSTEERING DEVICE

(75) Inventors: Bruce K. Winker, Ventura, CA (US); Zhiming Zhuang, Buffalo Grove, IL (US)

(73) Assignee: Innovative Technology Licensing, LLC, Thousand Oaks, CA (US)

(*) Notice: Subject to any disclaimer, the term of this patent is extended or adjusted under 35 U.S.C. 154(b) by 0 days.

(21) Appl. No.: 09/675,300

(22) Filed: Sep. 29, 2000

(51) Int. Cl.[7] ............................. G02F 1/01; G02F 1/29; G02F 1/13

(52) U.S. Cl. ................ 359/279; 359/253; 359/315; 359/316; 359/209; 359/573; 359/245; 349/140; 349/193; 349/202; 250/227.17; 385/14; 385/130

(58) Field of Search ................ 359/279, 315, 359/316, 318, 319, 209, 245, 252, 246, 254, 256, 573; 349/140, 193, 202, 33, 56, 141; 250/227.17; 385/14, 130

(56) References Cited

U.S. PATENT DOCUMENTS

| | | | | |
|---|---|---|---|---|
| 3,813,142 A | * | 5/1974 | Buhrer | 359/279 |
| 5,093,740 A | | 3/1992 | Dorshcner et al. | 349/202 |
| 5,093,747 A | | 3/1992 | Dorschner | 359/316 |
| 5,151,814 A | | 9/1992 | Grinberg et al. | 359/209 |
| 5,212,583 A | * | 5/1993 | Vali et al. | 359/245 |
| 5,973,817 A | * | 10/1999 | Robinson et al. | 359/279 |

FOREIGN PATENT DOCUMENTS

| | | |
|---|---|---|
| EP | 0785457 A2 | 7/1997 |
| EP | 0785457 A3 | 10/1998 |

OTHER PUBLICATIONS

*Dynamical Properties of LC Wavefront Correctors and Adaptive System for Optimal Control Selecting*, Naumov, A.F. and V.N. Belopukhov, XP–008003265, SPIE vol. 3688.0277–786X/99/, pp. 476–484.
*Optical Phased Array Technology*, Mcmannamon et al., The IEEE, vol. 84 No. 2, Feb. 1996.
*Grating Polarizing Beam–Splitter Using Polymerized Liquid Crystal*, Jpn J. Appl Phys. vol. 36 (1997) pp. 589–590, Part 1 No. 1B.
*High–Efficiency Liquid–Crystal Optical Phased–Array Beam Steering*, Resler et al., Optical Society of America 1996, vol. 21, No. 9/ Optics Letters, pp. 689–691.
*Applications Look at the Use of Liquid Crystal Writable Gratings for Steering Passive Radiation*, McManamon et al., Optical Engineering 32(11), 2657–2664, Nov. 1993.
*Lixon L. C. Mixtures for Dual Frequency Addressing*, Preliminary Data Sheet, Chisso Corporation Head Office.

\* cited by examiner

*Primary Examiner*—Loha Ben
(74) *Attorney, Agent, or Firm*—Koppel, Jacobs, Patrick & Heybl

(57) ABSTRACT

An electrical exciting circuit produces a plurality of oscillating electrical excitations, each at an independently controllable frequency. A set of drive electrodes are distributed in an array, and connected so that each receives a respective one of the excitations. A dual frequency liquid crystal (DFLC) material is arranged in the path of a coherent light beam and is disposed in proximity to the set of drive electrodes so as to receive electrical excitations. The DFLC has a dielectric coefficient which varies locally in relation to the frequency of the local electrical excitation received. The voltages and at least two frequencies of the excitations are controlled so as to produce a desired profile of the dielectric coefficient (for at least one polarization) and a corresponding optical phase delay profile for the coherent beam. Preferably, a novel reflective groundplane is included to improve optical reflective efficiency.

12 Claims, 9 Drawing Sheets

FREQUENCY MODULATED LIQUID CRYSTAL BEAMSTEERING DEVICE

BACKGROUND OF THE INVENTION

1. Field of the Invention

This invention relates to spatial light modulation and electro-optical devices generally, and more specifically to high speed, liquid crystal diffractive beamsteering devices and adaptive optics.

2. Description of the Related Art

A high speed, non-mechanical beamsteering device finds applications in optical fiber and laser communications, laser radar or other fields which require fast adaptive optics. High switching speed, wide steering range, fine angular resolution and high optical efficiency are particularly desirable in such a device.

One conventional approach for high speed diffractive beamsteering exploits the electro-optical properties of liquid crystals (LCs). This approach is analogous to the use of phased-arrays to direct microwave radiation, and has been clearly explained in several publications: see, for example, Paul F. McManamon, Edward A Watson, Terry A. Dorschner and Lawrence J. Barnes, "Applications Look at the Use of Liquid Crystal Writable Gratings for Steering Passive Radiation," *Optical Engineering* Vol. 32, No. 11, pp. 2657–2664, (November 1993); D. P. Resler, D. S. Hobbs, R. C. Sharp, L. J. Friedman and T. A. Dorschner, "High Efficiency Liquid Crystal Optical Phased-array Beam Steering," *Optics Letters*, Vol. 21, No. 9, pp. 689–691 (May 1, 1996); Paul F. McManamon, Terry A. Dorschner, David L. Corkum, Larry J. Friedman, Douglas S. Hobbs, Michael Holz, Sergey Liberman, Huy Q. Nguyen, Daniel P. Resler, Richard C. Sharp, and Edward A. Watson, "Optical Phased Array Technology," *Proceedings of the I.E.E.E.*, Vol. 84, No. 2, pp. 268–298 (February 1996); and O. D. Lavrentovich, D. Subacius, S. V. Shiyanovskii, and P. J. Bos, "Electrically Controlled Cholesteric gratings," *SPIE* Vol. 3292, pp. 37–43 (1998).

The principle behind diffractive beamsteering by liquid crystal phase shifting is illustrated in FIG. 1. For simplicity, unidirectional (single angle) steering is shown. An incident coherent optical beam 20 is shown by its equi-phase surfaces. If we consider a hypothetical prism 22 inserted into the beam path, we can see that such a prism would introduce a linear gradient of optical path delay (OPD) across the beam, shown by phase delay profile 24. Because the prism has thickness which varies linearly with displacement in the direction x, it introduces corresponding linear phase delay profile 24, with constant gradient. The introduction of constant gradient of phase delay results in refraction of the beam 20, so the resulting output beam has equiphase fronts 26, propagating in a new direction as shown by direction vector 28.

In the arrangement of FIG. 1 a phase shift of 2π can be subtracted periodically from the phase front without influencing the far-field pattern produced (because it corresponds to exactly one wavelength of the light beam). Thus, to produce refraction equivalent to that produced by the OPD gradient 24, it is sufficient to introduce a periodic, sawtooth-like or "folded" phase profile as shown by the periodic OPD profile 30. The phase profile 30 is equivalent to that of 24 except that the phase is reset whenever the cumulative phase shift reaches 2π or an integer multiple thereof. The sawtooth phase profile 30 is also essentially equivalent to that produced by a conventional blazed grating.

FIG. 2 shows a simplified reflection mode device which uses liquid crystals to produce phase shifts approximating the blazed grating profile shown in FIG. 1, to steer a coherent beam. The illustration is a simplistic idealization of that device described in U.S. Pat. Nos. 5,098,740 and 5,093,747 (to Dorschner et al. and Dorschner, respectively). A layer of nematic liquid crystals 40 is sandwiched between a reflective groundplane electrode 42 and an array of discrete, electrically distinct transparent electrodes 44. The elements of the electrode array 44 are electrically connected to a plurality of drive voltages which vary stepwise across the array according to a staircase-like voltage ramp. The variation in electrode potential produces a corresponding variation in electrical field intensity at points within the liquid crystal layer 40. Manifestly, the electric field will vary with position within the layer, in accordance with electrostatic principles, but the average field will vary across the device in an approximate staircase profile. The material of the liquid crystal layer 40 is a nematic liquid crystal with the property that its orientation is dependent upon the field strength locally applied; therefore, the effective refractive index of the LC (for a particular polarization) will vary with distance x; and the resulting phase delay introduced during light's transit across the LC layer will also vary approximately as the staircase-like ramp 48.

To implement electrically controlled beam steering in the above described device, the reflective electrode elements of 44 are controlled through addressing electronics to allow application of pre-determined voltages to the elements as required to produce a sawtoothed optical phase delay function. If the voltages are controlled so that the phase delay is reset periodically by subtracting 2π, then the resulting sawtooth OPD profile 48 approximates a linear phase delay gradient across the device in the x direction. Comparing this function to the phase functions in FIG. 1, we can see that the resulting function approximates the phase delay gradient of a refractive prism. The effect of such a gradient, together with the reflective electrodes 44, is such that incident (polarized) radiation 20 is reflected at an adjustable angle θ, in relation to the voltage profile applied to the electrode array 44.

While the device of FIG. 2 seems to hold promise as a beamsteering device, it is limited in several important performance parameters. Most significantly, switching speeds currently achievable by this device at the important communication wavelength of 1.55 nanometer are limited to below approximately 500 Hz. This limitation results from the relatively slow relaxation of nematic crystals as they settle from driven to relaxed states. Attempts have been made to improve switching speeds by increasing the liquid crystal birefringence, thereby reducing the cell gap (the thickness of LC layer 40); however, any such increase in birefringence is accompanied by an increase in viscosity, which in turn increases the relaxation time of the LC.

In addition to slow switching speeds, conventional nematic LCs have weak elastic anchoring forces which forbid very high phase gradients. Such gradients would be particularly desirable for low grating pitch and high steering angles (pitches of less than approximately 5 microns).

Another problem with prior LC optical phased array steering devices is their undesirable departure from ideal sawtoothed OPD characteristics. FIG. 3 compares the ideal and actual OPD characteristics of a typical LC optical phased array beamsteering device. The OPD function 58 represents the idealized, desirable sawtooth pattern. Note that the reset portion 60 of the waveform is ideally vertical, which signifies that the phase is reset from 2π to zero over infinitesimal distance in the x direction. This idealized characteristic is not realizable by physical LC devices.

Waveform 62 represents a more realistic, attainable waveform. In practice, the gradient of the phase delay is limited by the finite "fly-back" distance 64. The optical efficiency of the real device is in inverse relation to the length of the fly-back distance 64. As this distance becomes longer, ever greater fractions of the input beam are diffracted into undesired grating modes (secondary modes or higher). The attainable fly-back distance is limited by the elastic anchoring forces of the liquid crystal and by the field gradients obtainable within the device. Consequentially, the optical efficiency of a real device is limited by the elastic anchoring forces of the liquid crystal and the electric fringe-field effects in the flay-back region.

Prior liquid crystal phased array beamsteering devices limit the available beamsteering angles to discrete angle increments. This results from the conventional pixel interconnection and drive schemes. Commonly, in a conventional LC array not all of the electrode elements are electrically independent; rather, every nth electrode is typically connected together to form a periodically repeating series of electrodes. For example, referring back to FIG. 2, electrodes 65a and 65b are electrically connected, as are the other electrodes which correspond in a periodic sequence. Not all of the interconnects have been illustrated, to preserve clarity in the drawing. This periodic interconnection scheme limits the available beamsteering angles. The addressable beamsteering angles are restricted to those that correspond to integer multiples of $2\pi$ phase ramps across each electrode subarray. Although large subarrays can accommodate many possible integer factors (and thus many steerable angles), the steerable angle is still limited to discrete increments; it is not continuously variable. This limitation is discussed in Resler et al., cited above.

SUMMARY OF THE INVENTION

In view of the above problems, the present invention is a device and method for imposing a spatial phase modulation on a coherent light beam. The device and method are particularly useful for beamsteering, although they can also be used to impose other spatial light modulations on a beam.

In the device, an electrical exciting circuit produces a plurality of oscillating electrical excitations, at least two of which have independently controllable frequencies. A set of drive electrodes are distributed in an array, and connected so that each receives a respective one of the oscillating electrical excitations from the electrical exciting circuit. A liquid crystal material is arranged to receive the coherent light beam and is disposed in proximity to the set of drive electrodes so as to receive electrical excitations in local regions from the drive electrodes. The liquid crystal material has a dielectric coefficient (for at least one polarization) which varies in its local regions in relation to the frequency of the local electrical excitation received by those regions. The frequencies and preferably also the voltages of the excitations are controlled so as to produce a desired profile of the refractive index (for at least one polarization) and a corresponding optical phase delay profile for the coherent beam which traverses the liquid crystal layer.

In one embodiment, at least the top electrode is transparent and the invention includes a high-efficiency reflective groundplane, displaced behind the drive electrodes at a distance substantially equal to an integer multiple of one half wavelength for the wavelength of the coherent beam. The groundplane increases optical efficiency by increasing reflective area without destroying the phase coherency.

The invention can suitably be embodied as either a unidirectional or a bidirectional beamsteering device. In a unidirectional device the electrodes are preferably a linear array of elongated narrow stripes. Such a device is suitable for beamsteering in a plane. The bidirectional device includes a two-dimensional, (preferably rectilinear) array of addressable electrodes, capable of producing phase gradients in two independent directions simultaneously, thereby steering a beam in two independent angles, most preferably in orthogonal directions.

These and other features and advantages of the invention will be apparent to those skilled in the art from the following detailed description of preferred embodiments, taken together with the accompanying drawings, in which:

DETAILED DESCRIPTION OF THE INVENTION

The beamsteering device of the invention can be embodied in either a unidirectional or a bidirectional steering device. For ease of exposition, the unidirectional embodiment will be described first; the principles of the unidirectional device, once explained, will greatly facilitate explanation of the bidirectional embodiment.

Figure 4:
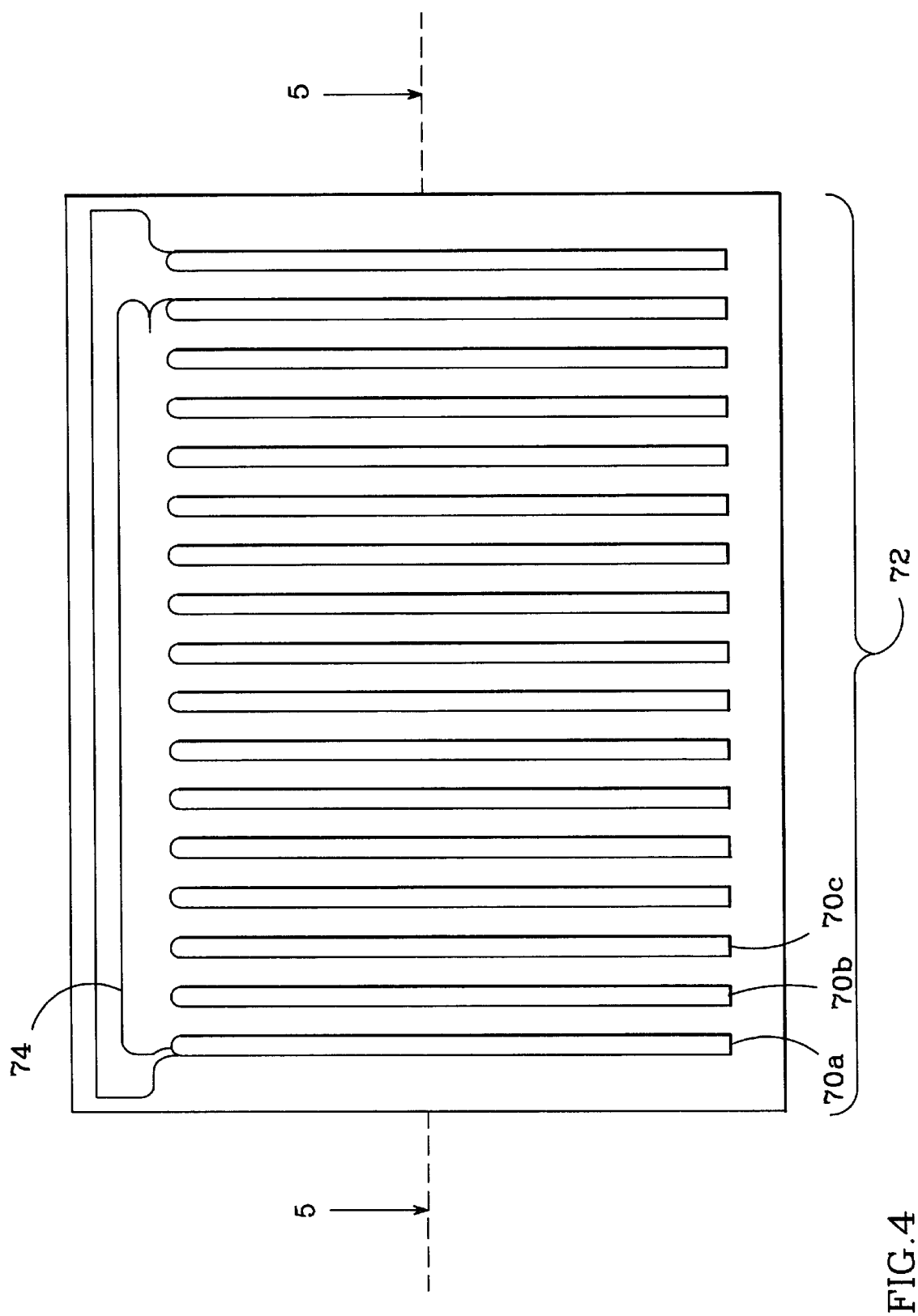
FIG. 4 is a plan view of a beamsteering device in accordance with the invention, suitable for beamsteering in one dimension.

FIG. 4 shows the unidirectional embodiment in plan view. A plurality of individually excitable drive electrodes such as 70a and 70b et seq. collectively make up a linear array of drive electrodes 72. Actual size and number of electrodes cannot be illustrated here: preferably the drive electrodes should be spaced on a pitch on the order of ten microns or less, and should be sufficiently numerous to span a desired beam width. Only a few discrete drive electrodes are shown for the purpose of illustration. An integrated electrical exciting circuit 74 routes appropriate driving signals to each of the electrically independent drive electrodes in the array 72. The electrical exciting circuit 74 can suitably be disposed alongside the array as shown, or could be otherwise disposed in electrical communication with the electrodes (for example, on a separate substrate). Preferably, the exciting circuit 74 is integrated with addressing electronics, to route the appropriate drive signal to a corresponding electrode, under digital addressing control from an external programming device (not shown).

Figure 5:
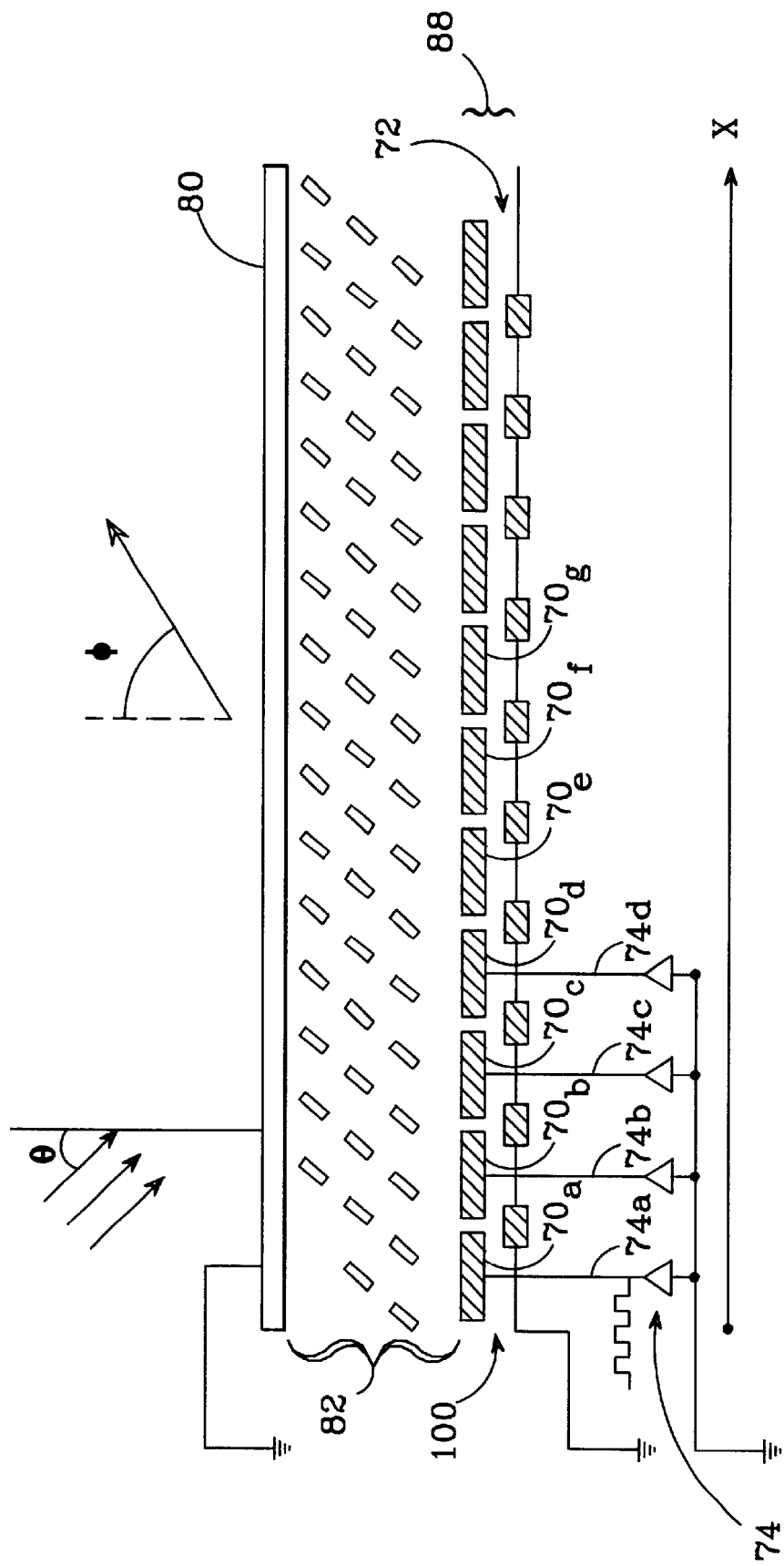
FIG. 5 is a cross-sectional view taken along section line 5 of FIG. 4.

FIG. 5 shows a cross section of a unidirectional beam-steering device in accordance with the invention. A transparent top electrode 80 is disposed on a surface in the path of the incoming radiation 81 which is incident at angle θ. The transparent electrode 80 can suitably be fabricated, for example, from indium tin oxide or any other conductive material which is transparent at the wavelength of the incident radiation. In one exemplary embodiment, indium tin oxide is used with a coherent beam at a wavelength of 1.55 microns.

A dual frequency birefringent liquid crystal layer 82 is sandwiched between the drive electrode array 72 including multiple independent drive electrodes such as 70a–70g. The properties of the dual frequency liquid crystal layer are of particular significance to the invention, and are discussed below ("Dual Frequency Liquid Crystals"). The multiple electrodes (72a, 72b, etc.) of array 72 are respectively driven by corresponding multiple drive outputs (74a, 74b, 74c etc.) from exciting circuit 74.

Exciting circuit 74, including multiple independent drive outputs 74a, 74b, etc., provides multiple drive signals which may differ in amplitude (voltage) and frequency. In accordance with the invention, at least two drive signals of two respective distinct frequencies should be used to produce high phase gradients and fast switching times.

Preferably, a conductive groundplane 88 underlies the electrode array 72 and is connected to a common potential ("ground") to influence the electric field generated by the electrodes 72, so as to improve the fringe field of electrodes 72. (In this context, "improve" means to modify the inter-electrode field in such a way as to enable production of steeper optical phase gradients in the liquid crystal layer.) For generality, the groundplane is shown connected to a reference voltage $V_3$, while the top electrode 80 is shown connected to an independent reference voltage $V_2$. However in some embodiments both the groundplane 88 and the transparent electrode 80 are connected to a common potential (arbitrarily designated "ground").

The device of FIG. 5 can electro-optically steer a coherent beam by imposing on the beam a phase gradient which is a modulo 2π periodic modification of a linear phase gradient (the gradient of phase delay with respect to displacement in the arbitrary x direction). The imposition of such a gradient on the beam causes diffractive beam deflection in relation to the magnitude of the OPD gradient. Thus the incident beam 81 passes through the transparent electrode 80, traverses the liquid crystal layer 82, is reflected from reflective electrodes 72 (and to some degree by groundplane 88), again traverses the liquid crystal layer 82 in the reverse direction, and exits the device with a modified phase profile at a resulting new direction at angle φ.

Dual Frequency Liquid Crystals

In accordance with the invention, the liquid crystal layer 82 includes a "dual frequency" liquid crystal material. As used herein, the term "dual frequency Liquid Crystal" (DFLC) means a liquid crystal material which has at least one dielectric coefficient which varies as a function of the frequency of an oscillating electrical excitation applied to the material.

In nematic DFLC materials, the parallel dielectric coefficient is highly dispersive. We define "dielectric anisotropy" as the difference between the distinct dielectric coefficients: (a) for electric fields which are parallel to, and (b) for electric fields perpendicular to the nematic director of the liquid crystal. In nematic DFLCs the dielectric anisotropy is varies as a function of the frequency of an excitation voltage applied to the material. This feature causes the dielectric anisotropy to change sign at a defined frequency, specifically referred to as a "crossover frequency". This property allows such materials to be rapidly driven to any phase delay state by controlling the amplitude and frequency of a driving excitation.

Figure 6A:
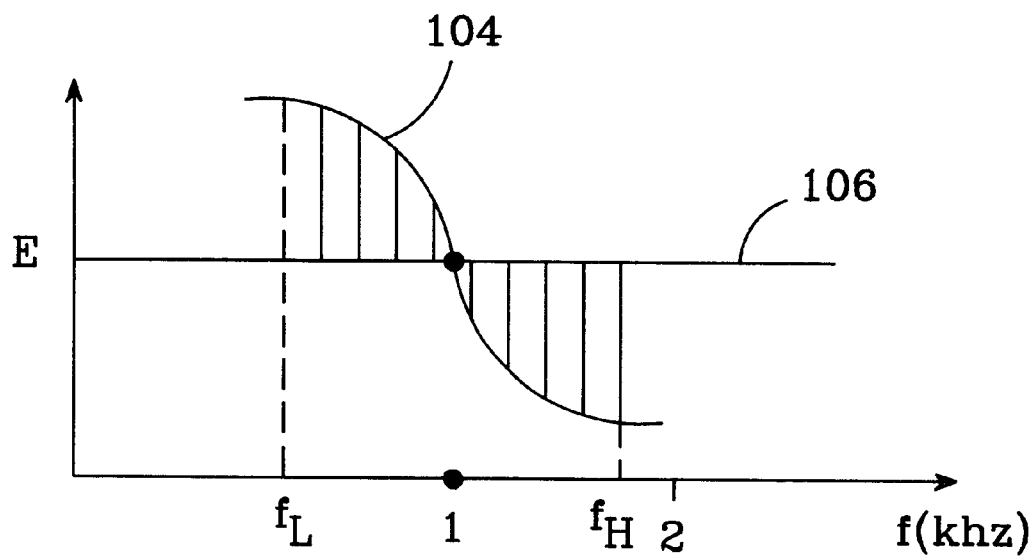
FIG. 6a is a graph of the dielectric coefficients, for molecular orientations parallel and perpendicular to an electric field, as a function of electrical excitation frequency, for an exemplary dual frequency liquid crystal material suitable for use in the device of FIG. 5.

The frequency dependency of the dielectric coefficient of a typical DFLC is shown in FIG. 6a. The dielectric coefficient for electric field parallel to the LC's nematic director is graphed as curve 104; that for electric field perpendicular to the nematic director, as the flatter function 106. A crossover frequency 108 is apparent at the intersection of the curve 104 with 106.

Figure 6B:
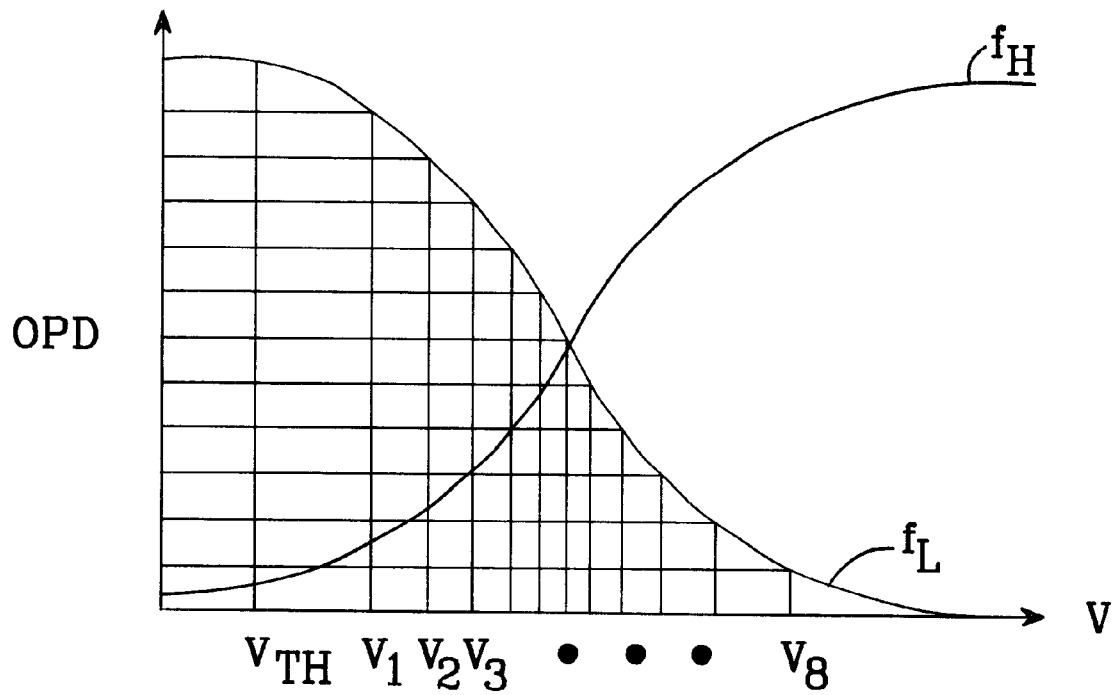
FIG. 6b is a graph of the optical phase delay (OPD) as a function of drive voltage V for a dual frequency liquid crystal material, showing curves for two distinct excitation frequencies.

Voltage dependency of the optical phase delay is shown for the same typical DFLC in FIG. 6b. Two curves are shown, labeled $f_h$ and $f_l$, corresponding respectively to the high frequency and low frequency liquid crystal response characteristics. The dual frequency behavior of the material is apparent in that high frequency behavior is radically different from the low frequency behavior: one curve has positive slope in the active region while the other has negative slope.

Dual frequency, nematic liquid crystals are available commercially, with properties suitable for use in the invention. Such materials are available, for example, from Chisso Corporation in Tokyo, Japan.

Figure 7:
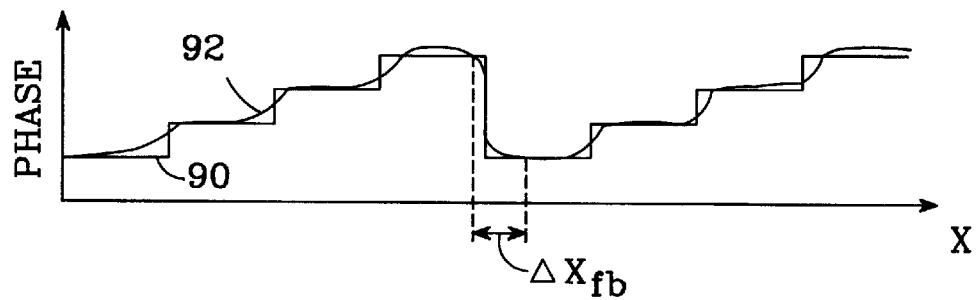
FIG. 7 is a graph of a phase delay profile produced in a light beam in response to a typical excitation profile in accordance with the invention, together with an idealized profile shown for comparison.

The invention uses the DFLC's dispersive frequency response to produce electrical modulation of the material's effective refractive index. FIG. 7 shows a suitable modulation scheme for use by the invention to produce a desired, tunable sawtooth phase modulation pattern. Phase profile for only a small region of the device is shown.

Because the OPD of the DFLC material varies as a function of two independent variables (voltage and frequency of excitation, refer to FIGS. 6a and 6b), there are numberless possible combinations of frequencies and voltages which could be used to produce a given, desired OPD function. However, it is highly preferable that at least two distinct frequencies be applied to two respective electrodes, most preferably two electrodes which define the flay-back region of the phase profile. This enables faster switching times, shorter flay-back and high phase gradients. An example of one specific modulation scheme in accordance with the invention is discussed below, in connection with FIG. 11.

The resulting modulation of the optical phase delay (OPD) is shown in FIG. 7 as a function of position in the LC 82. a theoretical, ideal stairstep function 90 is shown, along with a more realistic, smoothed function 92. The real function 92 differs from the theoretical function in that it has no discontinuous transitions. The phase delay function 92 approximates a blazed grating phase profile.

Thus, coherent radiation incident on the device will be reflected at an angle φ (shown if FIG. 5) which is in relation to the gradient of the OPD function 92.

Certain advantages are obtained by controlling the frequency of excitation of a DFLC as described above, rather than modulating only the magnitude of the exciting voltage as in the prior art. Most important among these advantages is improved switching speed. When an electrical excitation is removed from a conventional, voltage modulated LC cell, the LC molecules passively return to their equilibrium state under the influence of relatively weak elastic forces. This relaxation process is relatively slow. In contrast, the invention actively drives each electrode with an oscillating voltage. The DFLC thus driven changes molecular orientations more rapidly than a passively relaxing LC, and can therefore achieve switching speeds of greater than 1 KHz.

Another advantage of the invention is improved optical efficiency as compared with prior LC beamsteering devices. As discussed above, in connection with the background of the invention, very short flay-back distances are desirable to best realize an ideal sawtoothed OPD profile. Larger flay-back distances will inevitably result in diversion of some optical energy into undesired diffraction orders. The minimum obtainable flay-back distance, for a given material, is limited by the maximum gradient obtainable for the refractive index of the LC. In a conventional arrangement, the "off" state (zero potential applied) is maintained only by the weak elastic restoring forces of the LC. Increasing the drive will not necessarily result in increased gradient beyond a certain point. On the other hand, in the invention the gradient of the effective refractive index is established by strong driving signals, which allows greater gradients to be established. Greater gradients in turn lead to smaller flay-back distance ($\Delta x_{fb}$ in FIG. 7b), resulting ultimately in improved optical efficiency with correspondingly lower sidelobe intensity.

A further consequence of the greater gradients obtainable in the invention is the ability to deflect a beam through a greater range of angles. The deflection produced varies in relation to the gradient of the OPD profile with respect to distance (x in the FIGS. 5 and 7). Driving the electrodes at predetermined frequencies allows the production of greater phase delay gradients (for a LC of a given thickness and variation in birefringence), because it does not rely on passive material relaxation, as discussed above. Thus, the invention can attain greater deflections than prior LC beamsteering devices of comparable thickness.

Super Diffraction-Limited Steering

For many applications, it is desirable to deflect a beam through a continuum of deflection angles so as to move the far field beam less than the width of a diffraction-limited beam. This requires that the deflection angle can be selected from a continuum of angles. To produce such a result with the invention, it is sufficient to provide two features: first, the beamsteering electrode array (in FIG. 5) should preferably allow for independent addressing of each electrode across at least the beam spot size (rather than connecting every nth electrode in a periodically repeating series); secondly, the electrical drive to the electrodes should be capable of adding a linear, sub-wavelength phase ramp across the beam.

Thus, in the preferred embodiment of the invention, each electrode is electrically independently addressable, across the array, and the electrical excitation circuit 74 allows for addition of a phase ramp or correction across the beam (preferably, across the entire array) Independently addressable electrodes in the invention also enable more complex, non-linear phase corrections to be imposed on a beam, which allows the device to perform the corrections of an adaptive optics subsystem. Such capability is useful for correction of dynamic wavefront distortion which may be due to atmospheric turbulence, beam slewing, and optical aberrations, particularly at the extreme limits of the steering angle range.

For simple, linear beamsteering without sophisticated optical correction adjustments, a modulo 2π phase function is most suitable, as shown in FIG. 7b. Specifically, a phase gradient is applied in a quasi-periodic modulo 2π pattern. Thus, the phase delay approximately imposed on the beam at the electrode at a position x is ωx modulo 2π, where ω is the gradient of the phase delay with respect to displacement in the x direction (average slope of the ramp 92 in FIG. 7b). In its beam deflecting effect, the resulting phase profile is equivalent to a constant and continuous phase gradient across the array.

High Efficiency Groundplane

In the preferred embodiment of the invention a high efficiency reflective groundplane design is used behind electrode array 72 (in FIG. 5) to increase optical efficiency. A preferred groundplane arrangement is shown in detail in FIG. 8. A set of reflective groundplane electrodes 100 is constructed beneath the drive electrode array 72, preferably supported by a substrate 102 (suitably quartz or silicon). The two sets of electrodes are separated by a transparent, dielectric insulating layer 104 (suitably silicon nitride or similar material) with a thickness chosen to produce a full wave of retardation for light which traverses the transparent layer 104 (round trip, reflecting from groundplane 100). Thus, the returning optical wavefront at the plane of the array 72 is in phase with radiation reflecting from 72. In this way, the reflective groundplane electrodes 100 recover much of the light which would otherwise be lost in the gap between the electrodes (70a, 70b, etc.), and significantly reduces diffractive losses which would otherwise be caused by broken reflected wavefront, with erratic phase jumps.

The preferred reflective groundplane electrodes 100 also reduce undesired fringe field effects in the regions between the individual drive electrodes 70a, 70b, etc. A few postulated electric field lines 110 are shown, for a static electrical field. The actual field of the device in operation is dynamic, and therefore difficult to calculate and illustrate.

The reflective surface of the groundplane electrodes 100 should be planarized to reduce surface irregularities to below +/−25 nanometers. The drive electrodes 72 should be planarized to reduce the surface topology below +/−25 nanometers, which is typically required for uniform LC alignment.

Figure 1:
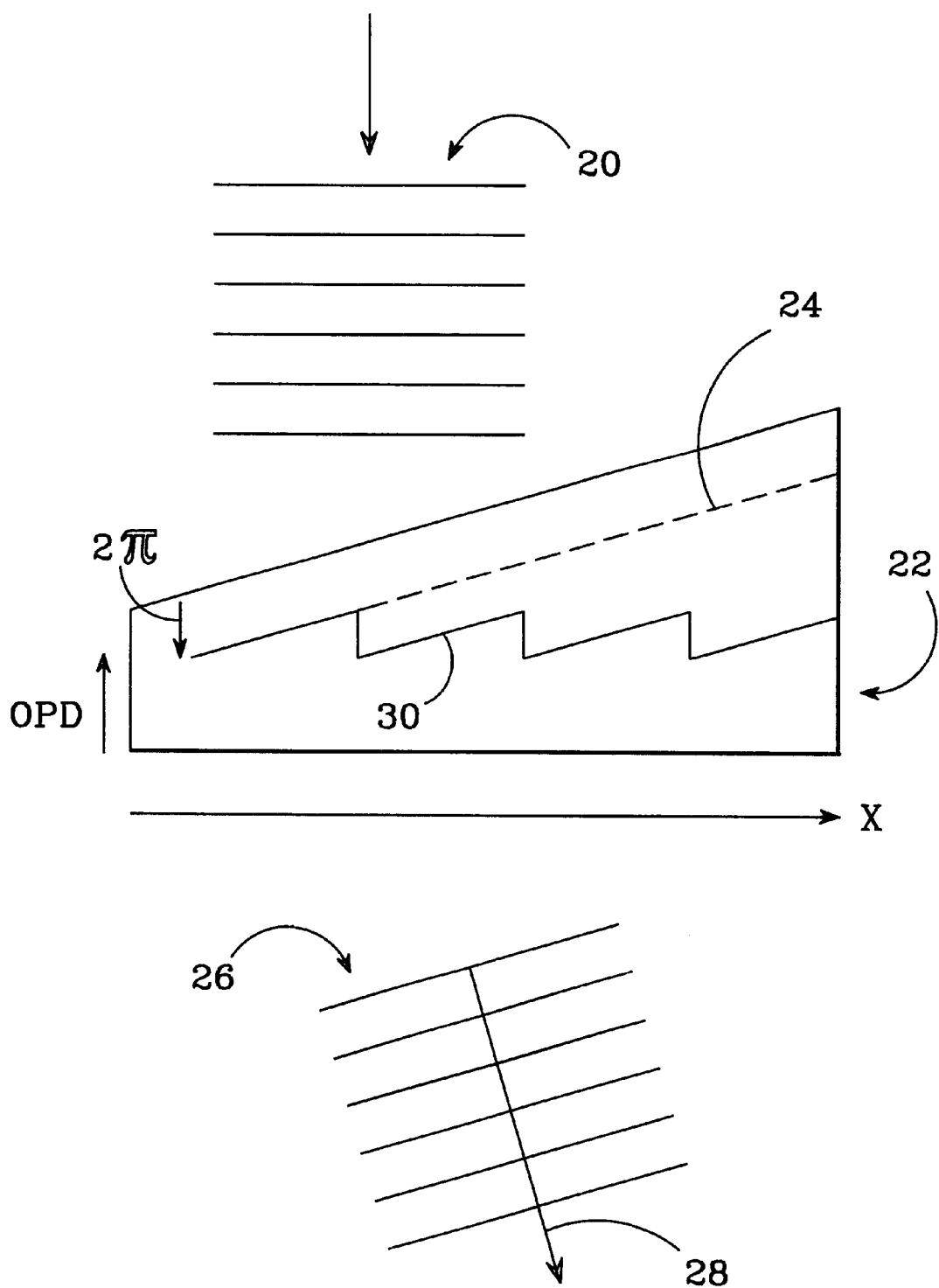
FIG. 1 is a sectional view showing wave and phase relationships in a prior art method of beamsteering, illustrated in the context of a conventional refractive prism.
Figure 2:
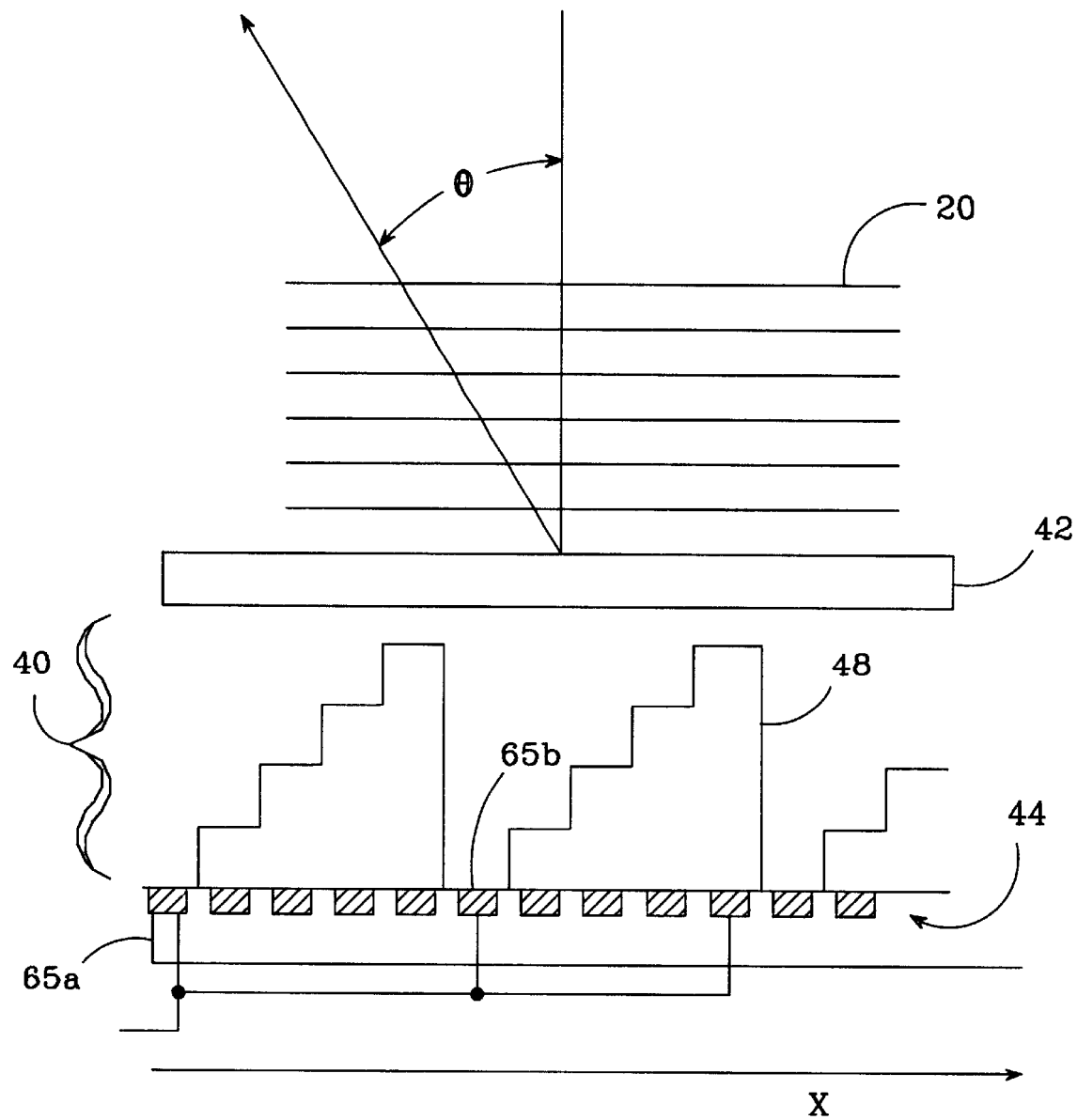
FIG. 2 is a sectional view of a prior beamsteering device which includes a liquid crystal material.
Figure 3:
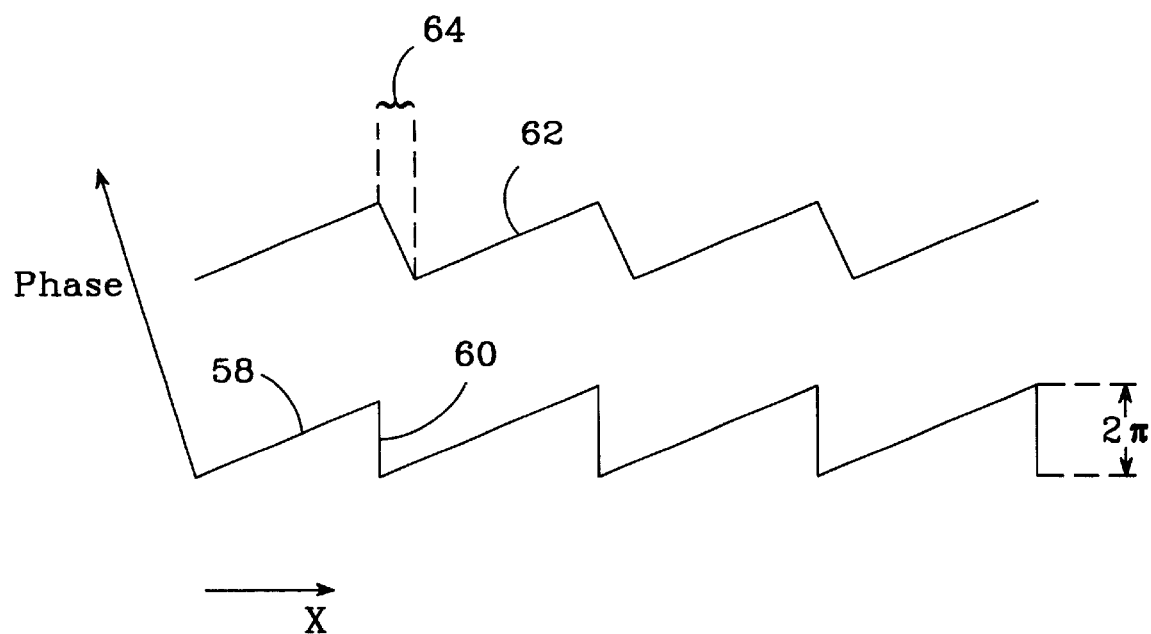
FIG. 3 is a graph showing phase delay as a function of displacement for a phase delay profile approximated by a prior art device, also showing an idealized profile for comparixon.
Figure 8:
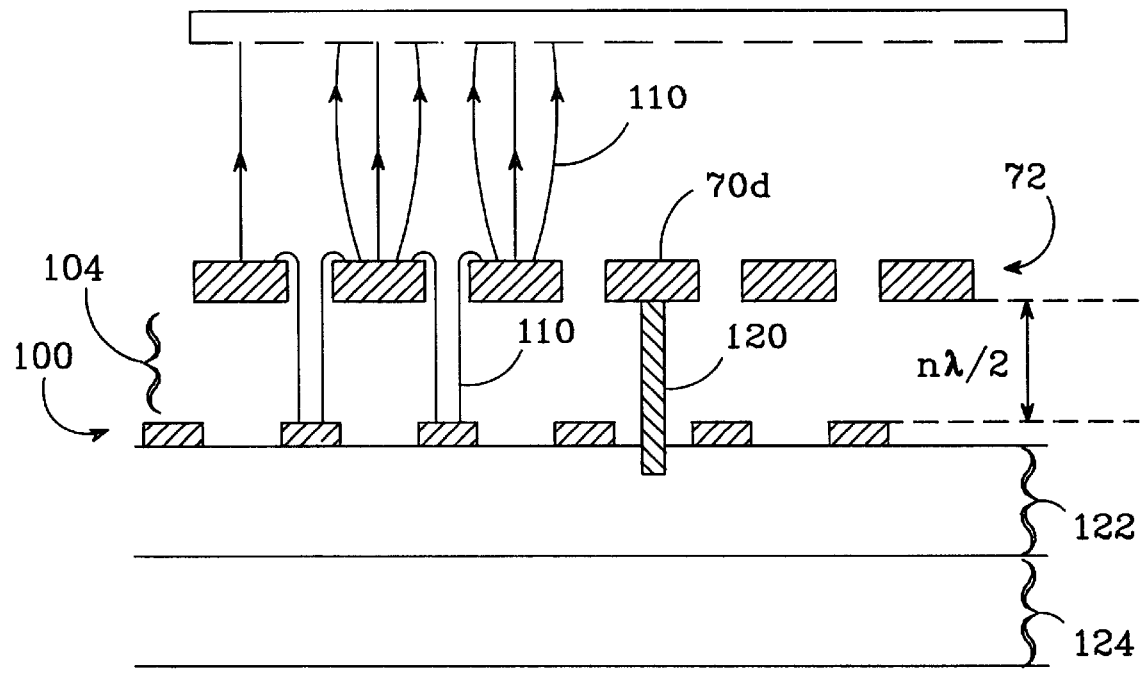
FIG. 8 is an expanded detail of the cross-section shown in FIG. 5, showing field lines and details of a preferred reflective groundplane structure used in some embodiments.

As an alternative to the series of separate groundplane electrodes 100, as shown in FIG. 8, a continuous groundplane or groundplane could be used, preserving the half-wave spacing of the gap (nλ/2, where n is an integer. However, the preferred version as shown is advantageous in that it leaves an electrically independent space under at least some of the drive electrodes of array 72. This space can accommodate signal vias, to connect to addressing electronics. For example, a via 120 is shown which passes through dielectric layer 104 to connect electrode 70d to an underlying circuit, suitably a VLSI CMOS addressing and driving circuit fabricated in layer 122 (on substrate 124). This arrangement can be used in a bidirectional beamsteering device, discussed immediately below.

Bidirectional Beamsteering Device

The invention can also be embodied as a two-dimensional beamsteering array, for deflecting the path of an optical beam through two non-coplanar angles. The principles of operation of the bidirectional embodiment are essentially the same as those of the unidirectional embodiment previously described.

Figure 9:
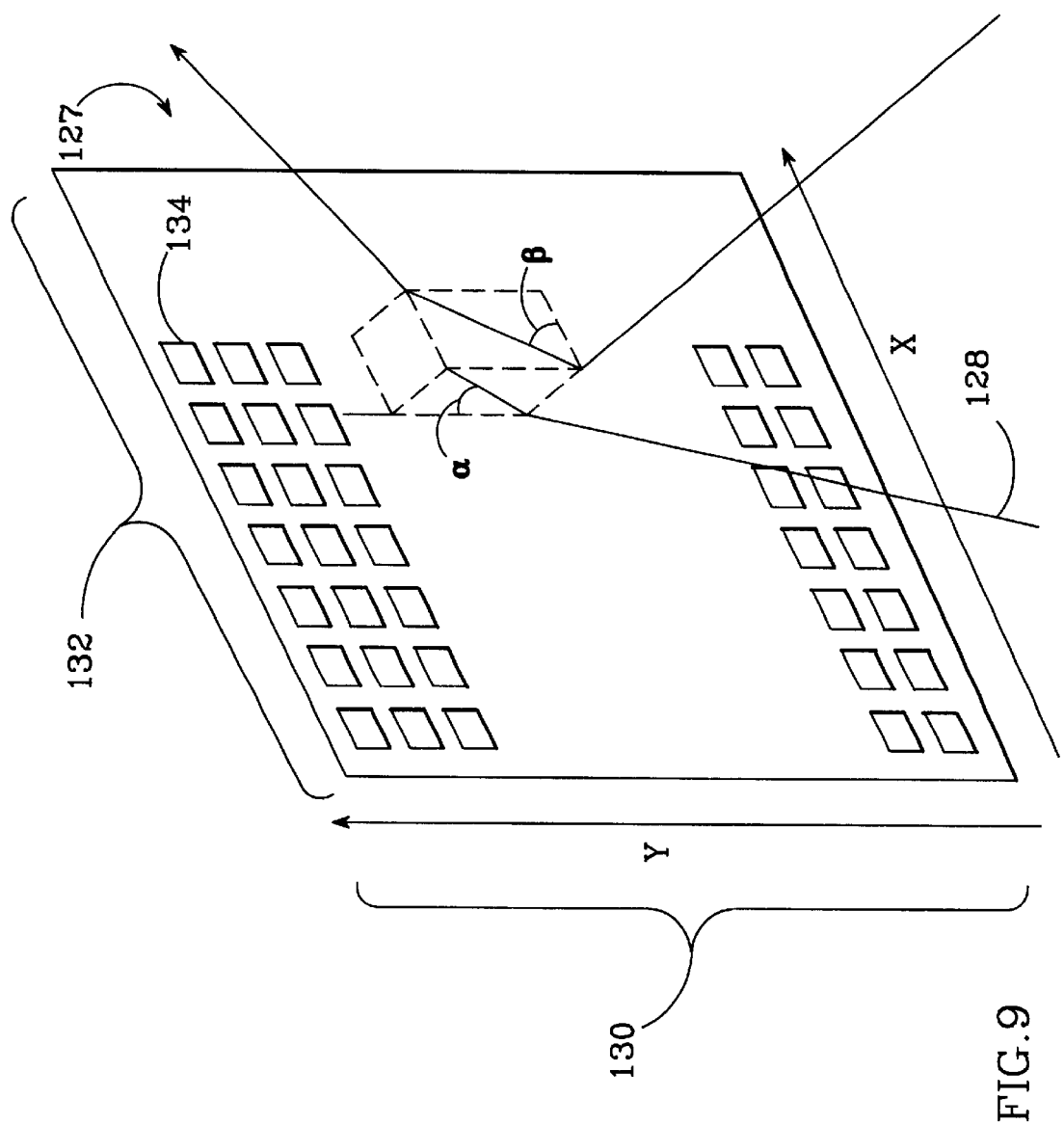
FIG. 9 is a perspective view of a typical bidirectional embodiment of the invention, which allows beamsteering according to two independent, non-coplanar angles.

FIG. 9 shows a perspective view of a bidirectional beamsteering device 127. The coherent light beam 128 impinges on a two-dimensional pixellated array, which is shown as a conventionally rectangular grid of rows 130 and columns 132. Multiple rectangular pixels 134 are shown preferably organized into perpendicular rows and columns. Each rectangular pixel includes its own independent drive electrode (such as 70a in FIG. 5). A small number of rows and columns are shown for illustration; obviously, a practical device will preferably include a much larger number (for example, 256 by 256).

Incident beam 128 strikes the device at an incident angle and reflects at an angle of reflection which can be decomposed into two, independent and non coplanar angles $\alpha$ and $\beta$, where a is the angle of the projection of the reflected ray into a plane parallel to the yz plane, and and $\beta$ is the angle of the projection of the reflected ray into the yx plane. Both angles are electro-optically variable by the two-dimensional beamsteering device 127: angle $\alpha$ by the OPD gradient in the x direction and angle $\beta$ by the OPD gradient in the y direction. Preferably, each pixel in the array should be independently addressable: an oscillating signal at a desired frequency can by routed to each pixel, in response to addressing inputs.

Figure 10:
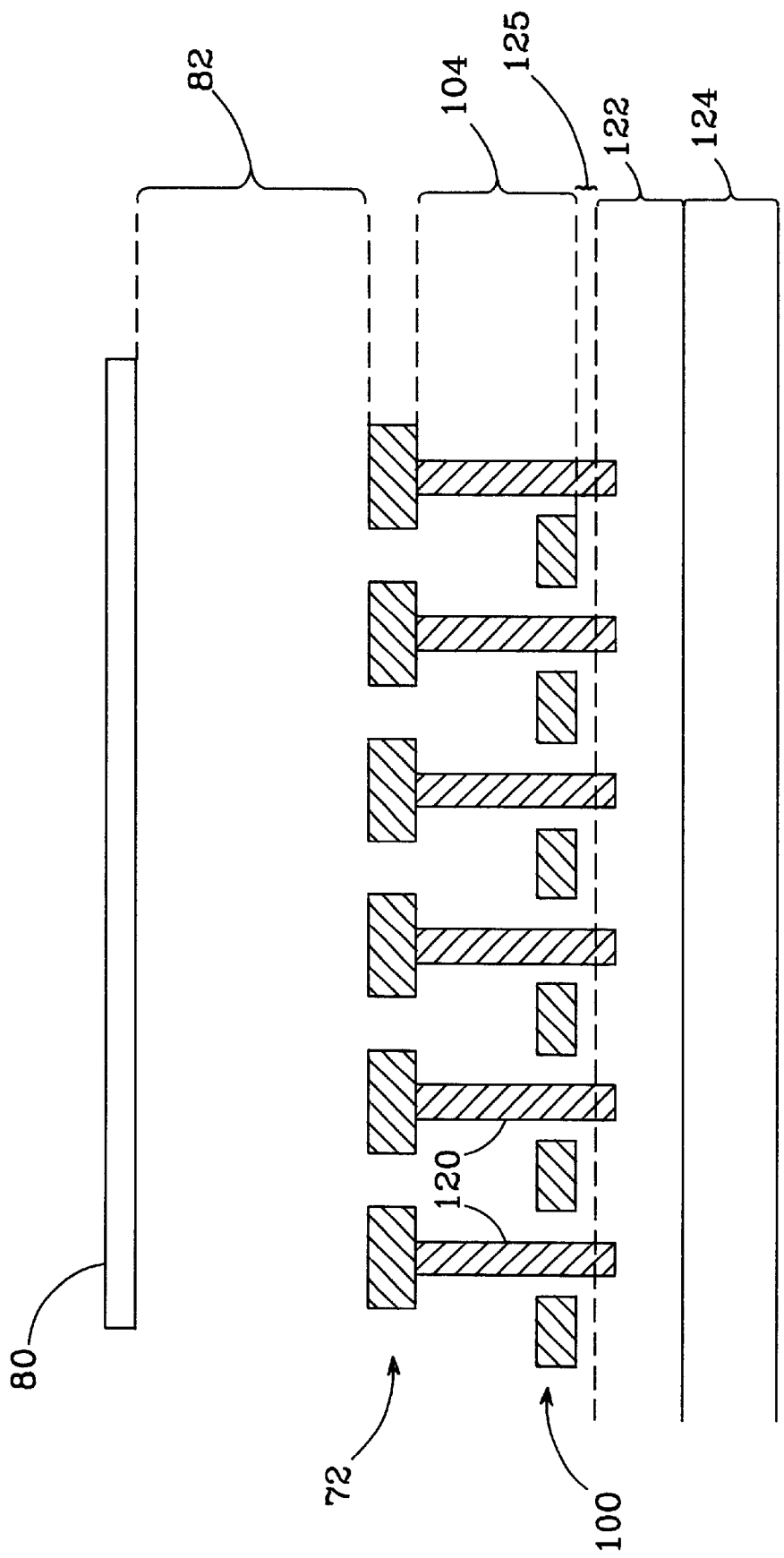
FIG. 10 is a cross-sectional view taken along section line 10 in FIG. 9.

FIG. 10 shows a cross section of the two-dimensional array of FIG. 9. The view is essentially identical to that of FIG. 5 (the unidirectional case) except for the need for vias to allow a signal path from addressing electronics to the steering electrodes 72. The arrangement of FIG. 10 is suitable for either the unidirectional steering or bidirectional steering embodiments (FIG. 4 or FIG. 9), while the vias can be avoided in the unidirectional embodiment (FIG. 4) by disposing the addressing and driving electronics laterally alongside the electrodes, rather than directly beneath. In FIG. 10, addressing electronics and an exciting circuit 74, preferably fabricated in CMOS, are fabricated in an underlying layer 122 on a substrate 124 and the top surface is planarized. Next, a transparent dielectric layer (preferably silicon nitride) is deposited with vias 120 are patterned through. Metal groundplane ground pads 100 are then deposited. A further layer 104 of transparent insulator (preferably silicon nitride) is then deposited, with vias 120 patterned for the circuit paths from the pixel addressing outputs to the drive electrodes 72. The drive electrodes 72 are then deposited, and the overlaying materials are deposited in the same way as for the unidirectional embodiment (of FIGS. 4 and 5).

Figure 11:
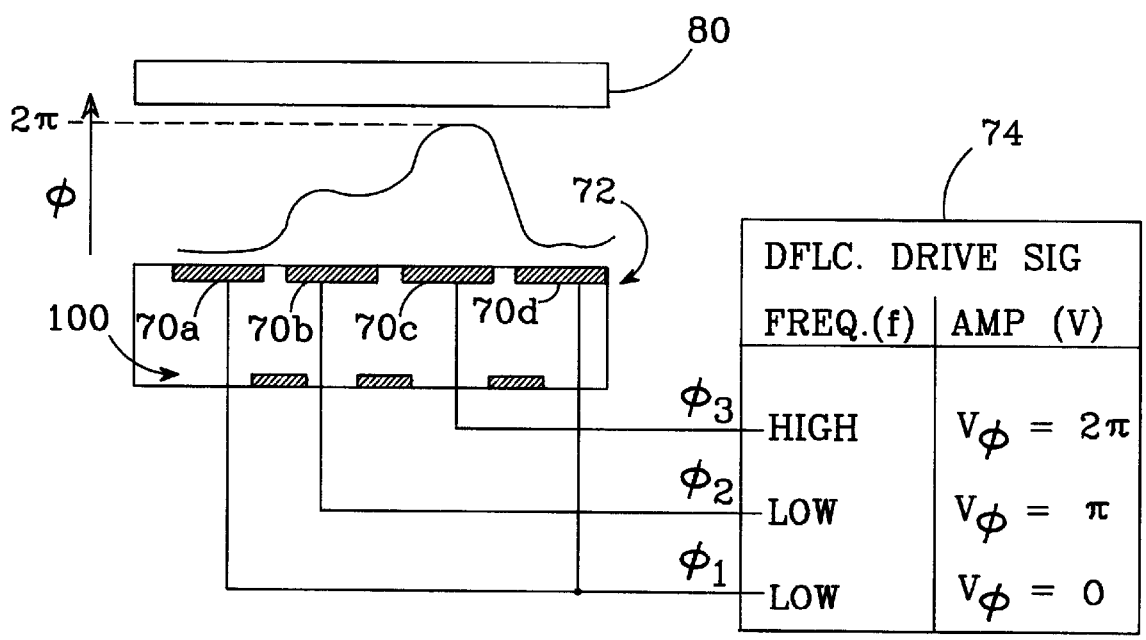
FIG. 11 is a schematic diagram including a partial sectional view, showing a specific useful scheme for modulating a DFLC beamsteerming device in accordance with the invention.

An unlimited number of combinations of frequency and voltage variation could be used to drive the electrodes of the invention, to produce a desired phase gradient. One particularly simple and useful drive scheme is illustrated in FIG. 11, for example and not by way of limitation. The scheme is illustrated for one direction of steering only, but it could easily be used in two independent directions as previously described.

In this particular scheme, the electrodes 72 are driven by a three distinct drive signals which repeat in a periodic, three-phase pattern. Four electrodes (70a–70d) are shown, to include the transition from the end of one series to the beginning of the next (the flay-back region). Phases one and two are achieved by driving at a comparitively lower frequency, while phase three is achieved by driving at a higher frequency. Phase two is obtained by driving at low frequency but different amplitude (voltage). The flay-back region is between high and low frequencies, thereby using the highest gradient obtainable within this drive scheme. Appropriate drive frequencies and voltages can be determined by reference to actual DFLC characteristic curves (the functions of FIGS. 6a and 6b for a specific material).

For a typical device in accordance with the invention, steering angles of greater than 1 degree ($\pi/180$ radians) are obtainable, with efficiencies of at least 50 per cent (0.5). If we define a unitless merit figure as the product of efficiency and radian angle traversed, merit figures in excess of 0.0087 are obtainable by the invention.

While several illustrative embodiments of the invention have been shown and described, numerous variations and alternate embodiments will occur to those skilled in the art. The steering electrodes could be laid out in other than rectangular patterns: for example, in hexagonal or other geometric arrangements. Materials could be adapted to various wavelength of light, as required. Non-uniform spacing of electrodes could be used, for example to accommodate aberrations, wide steering angles, astigmatism, or to adaptively correct wavefront phase profiles. A transparent equivalent embodiment could be realized (using transparent electrodes and avoiding reflective elements). Various conventional means of pixel addressing and frequency modulation could be employed. Although the device has been discussed primarily in the context of beamsteering applications, it is more generally useful as a spatial light modulator, and is capable of imposing on a beam almost any desired phase correction profile. Such variations and alternate embodiments are contemplated, and can be made without departing from the spirit and scope of the invention as defined in the appended claims.

We claim:

1. An electro-optical spatial light modulator, for imposing a spatial phase-modulation on a coherent light beam, comprising:

a set of drive electrodes, distributed in an array, with each electrode arranged to receive a respective oscillating electrical excitation;

a liquid crystal material, arranged to receive the coherent light beam and disposed in proximity to said set of drive electrodes so as to receive electrical excitations in local regions from said drive electrodes, said liquid crystal material having a dielectric coefficient which varies in said local regions in relation to the frequency of the local electrical excitation received by said regions; and a transparent top electrode, disposed on a first surface of said liquid crystal material and arranged to receive and transmit the coherent beam;

wherein said drive electrodes comprise flat, reflective electrodes distributed in a pattern across a second surface, separated from said first surface by said liquid crystal material so that said first and second surfaces define a layer of liquid crystal material;

and wherein said excitations are oscillating electrical potentials applied between said transparent top electrode and said drive electrodes, thereby establishing oscillating electrical fields in said liquid crystal layer.

2. The spatial light modulator of claim 1, further comprising:

an optically reflective, electrically conductive groundplane, said groundplane displaced behind said electrodes at a distance substantially equal to an integer multiple of one half wavelength for the coherent beam.

3. The spatial light modulator of claim 2, wherein said groundplane is divided into multiple optically reflective conductors separated from one another by non-conductive areas, said reflective conductors staggered with respect to said drive electrodes to receive and reflect radiation from the coherent beam which passes between said drive electrodes.

4. An electro-optical spatial light modulator, for imposing a spatial phase-modulation on a coherent light beam, comprising:

a set of drive electrodes, distributed in an array, with each electrode arranged to receive a respective oscillating electrical excitation; and a liquid crystal material, arranged to receive the coherent light beam and disposed in proximity to said set of drive electrodes so as to receive electrical excitations in local regions from said drive electrodes, said liquid crystal material having a dielectric coefficient which varies in said local regions in relation to the frequency of the local electrical excitation received by said regions;

wherein said liquid crystal material comprises a nematic liquid crystal with a crossover point in its relation between dielectric anisotropy and driving frequency;

said crossover point being the frequency at which said dielectric anisotropy changes sign; and dielectric anisotropy defined as the difference between the dielectric coefficients for electric fields which are (a) parallel to, and (b) perpendicular to the nematic director of the liquid crystal.

5. A method for electro-optically steering a coherent light beam by imposing an optical phase delay gradient across the beam, comprising:

providing a thin layer of frequency responsive liquid crystal material, arranged in the path of the beam;

said liquid crystal material having a dielectric coefficient which varies locally in response to the frequency of a locally applied, oscillating electromagnetic field; and driving said liquid crystal material with a plurality of independent electrical excitations dispersed spatially across said layer, thereby producing a spatial variation of the dielectric index across said layer in at least one direction;

wherein said plurality of electrical excitations are dispersed across said liquid crystal layer in a two-dimensional matrix, thereby allowing creation of a gradient along a vector in two dimensions, for steering a beam by two independent, non-coplanar angles; and wherein said excitations applied to said liquid crystal are pre-defined to produce a phase shift of approximately (x times b) modulo $2\pi$, where x is a position index assigning position to an individual electrode, and b is a phase gradient in the x direction, thereby imposing on the beam a phase ramp which varies between 0 and $2\pi$ in a modulo $2\pi$ pattern.

6. A method for electro-optically steering a coherent light beam by imposing an optical phase delay gradient across the beam, comprising:

providing a thin layer of frequency responsive liquid crystal material, arranged in the path of the beam;

said liquid crystal material having a dielectric coefficient which varies locally in response to the frequency of a locally applied, oscillating electromagnetic field; and driving said liquid crystal material with a plurality of independent electrical excitations dispersed spatially across said layer, thereby producing a spatial variation of the dielectric index across said layer in at least one direction;

wherein said plurality of electrical excitations includes at least two excitations with two respective frequencies;

thereby producing a gradient of optical phase delay for the coherent beam which traverses said liquid crystal layer, to steer the beam;

wherein said plurality of independent electrical excitations drive said liquid crystal material via respective reflective electrodes which are disposed on a surface of said liquid crystal material layer and patterned in a two-dimensional array, and wherein the excitations applied to said liquid crystal are defined to produce a further phase shift gradient in a second direction of approximately (y times c) modulo $2\pi$, where y is a second, independent position index assigning a second position component to an individual electrode, and c is a phase gradient in the y direction, thereby imposing on the beam a phase ramp which varies between 0 and 2n in a modulo $2\pi$ pattern.

7. A device for electro-optically steering a coherent light beam by imposing an optical phase delay gradient across the beam, comprising:

a transparent top electrode, disposed to receive and transmit the beam;

a set of reflective drive electrodes, arranged to receive and reflect the beam;

a liquid crystal layer, located in the path of the beam and between said top electrode and said set of reflective drive electrodes;

said liquid crystal layer having a dielectric coefficient which varies in relation to the frequency of an oscillating electromagnetic field applied across said layer between said top and said reflective drive electrodes;

an electrical exciting circuit with a plurality of outputs connected to respective ones of said drive electrodes, with at least two of said outputs independently variable in frequency to induce a gradient of optical phase delay across said liquid crystal layer.

8. The device of claim 7, further comprising a reflective groundplane disposed beneath said drive electrodes.

9. The device of claim 8, wherein said reflective groundplane comprises:

a transparent material, immediately underlying said drive electrodes and having a thickness substantially equal to an integer multiple of wavelengths for the coherent beam; and at least one reflective groundplane electrode underlying said transparent material, for modifying the fringe field of said drive electrodes and for reflecting the beam.

10. The device of claim 9, wherein said groundplane electrode and said top transparent electrode are at a common potential with respect to said drive electrodes, and said drive electrodes independently oscillate in potential with respect to said common potential.

11. The device of claim 7, wherein said liquid crystal layer comprises a nematic liquid crystal with a crossover point in its relation between dielectric anisotropy and driving frequency;

said crossover point being the frequency at which said dielectric anisotropy changes sign; and dielectric anisotropy defined as the difference between the dielectric coefficients for electric fields which are (a) parallel to, and (b) perpendicular to the nematic director of the liquid crystal.

12. The device of claim 7, wherein said liquid crystal layer comprises a nematic liquid crystal having a dielectric coefficient parallel to the nematic director.

* * * * *